United States Patent
Koeneman

(10) Patent No.: US 7,093,818 B2
(45) Date of Patent: Aug. 22, 2006

(54) EMBEDDED CONTROL VALVE USING HOMOPOLAR MOTOR

(75) Inventor: Paul B. Koeneman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 114 days.

(21) Appl. No.: 10/910,214

(22) Filed: Aug. 3, 2004

(65) Prior Publication Data
US 2006/0027777 A1    Feb. 9, 2006

(51) Int. Cl.
*F16K 5/10* (2006.01)
*F16K 5/02* (2006.01)

(52) U.S. Cl. ............................ 251/208; 251/207

(58) Field of Classification Search .......... 251/65, 251/207, 208, 206
See application file for complete search history.

(56) References Cited

U.S. PATENT DOCUMENTS

| | | | | |
|---|---|---|---|---|
| 3,548,231 | A | * | 12/1970 | MacNab ................ 310/178 |
| 4,148,460 | A | | 4/1979 | Kinsler |
| 4,387,312 | A | | 6/1983 | Oudet |
| 4,909,277 | A | * | 3/1990 | Vandiver ............. 137/493.7 |
| 5,097,170 | A | * | 3/1992 | Baines .................. 310/268 |
| 5,267,589 | A | | 12/1993 | Watanabe |
| 5,308,040 | A | * | 5/1994 | Torres .................... 251/208 |
| 5,488,969 | A | | 2/1996 | King et al. |
| 5,704,588 | A | * | 1/1998 | Korfgen et al. ......... 251/208 |
| 5,746,415 | A | | 5/1998 | Shimizu |
| 6,129,331 | A | * | 10/2000 | Henning et al. ......... 251/11 |
| 6,490,483 | B1 | | 12/2002 | Willis |
| 6,505,811 | B1 | | 1/2003 | Barron et al. |
| 6,561,208 | B1 | | 5/2003 | O'Connor et al. |

FOREIGN PATENT DOCUMENTS

JP        2003212297 A    *   7/2003

OTHER PUBLICATIONS

Murthy, N.S, et al., Effect of charge transfer on chain dimension in trans-polyacetylene; J. Chem. Phys, Aug. 15, 1987; pp. 2346-2348.
Product Profile; CF19-2186; Medium Cure Rate, General Purpose Silicone Elastomer, NuSil Technology, Carpinteria, CA, Feb. 6, 2004.

* cited by examiner

*Primary Examiner*—Justine R. Yu
*Assistant Examiner*—Andrew J. Rost
(74) *Attorney, Agent, or Firm*—Sacco & Associates, PA; Robert J. Sacco

(57) ABSTRACT

A method for controlling fluid flow. A fluid (560) can be communicated to a first fluid flow port (105) disposed adjacent to a first surface (196) of a rotatable disk (115) of a homopolar motor. The fluid can flow through at least one orifice (130) in the rotatable disk to a second fluid flow port (110). The rotation of the disk can be selectively controlled to vary a fluid flow rate. Further, the disk can be rotated to align a selected one of the orifices with at least one of the first and second fluid flow ports. In another arrangement, the shape of the orifice can have a radial width that increases in a circumferential direction.

15 Claims, 9 Drawing Sheets

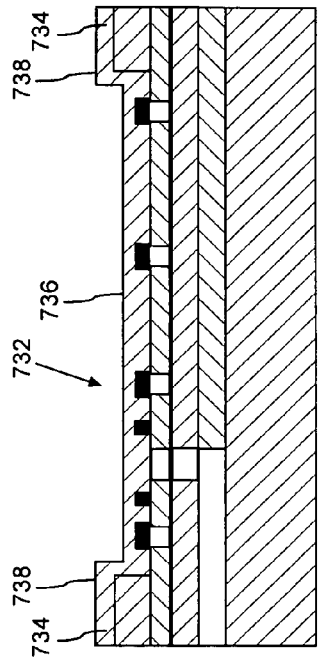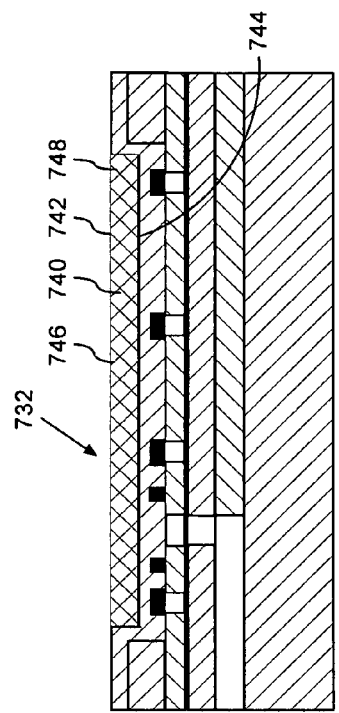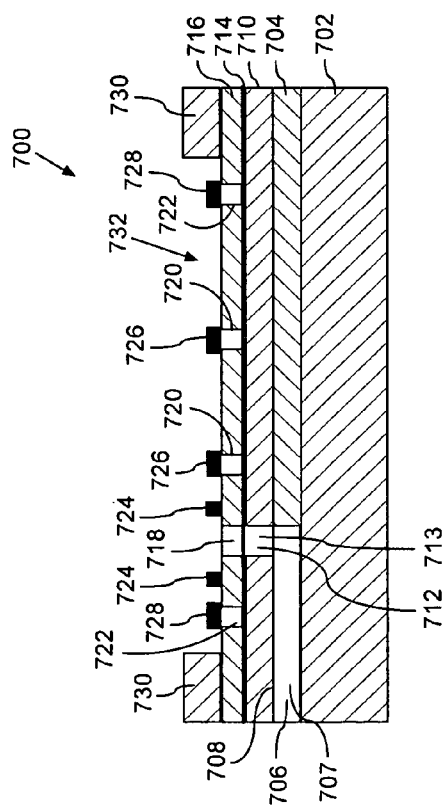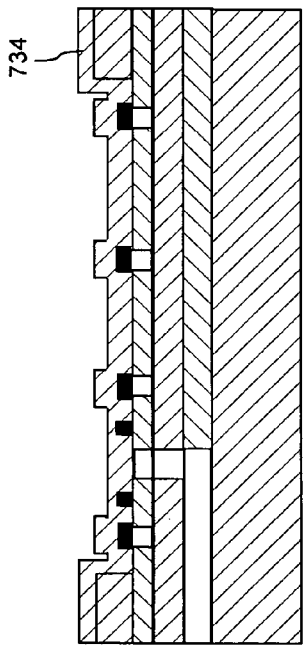
Fig. 7A
Fig. 7B
Fig. 7C
Fig. 7D

EMBEDDED CONTROL VALVE USING HOMOPOLAR MOTOR

BACKGROUND OF THE INVENTION

1. Statement of the Technical Field

The inventive arrangements relate generally to the field of micro devices, and more particularly to microfluidic control systems.

2. Description of the Related Art

Miniaturization of various devices which incorporate fluidic systems has spurred a need for fluidic systems having very small components. These systems are commonly known as microfluidic systems. Microfluidic systems have the potential to play an increasingly important role in many developing technology areas. For example, there has been an increasing interest in recent years in the use of liquid fuels in microengines and in the use of fluid dielectrics in electronics systems.

Another technological field where micro-fluidic systems are likely to play an increasingly important role is fuel cells. Fuel cells generate electricity and heat by electrochemically combining a fuel and an oxidant, via an ion-conducting electrolyte. Some types of fuel cells produce waste water as a byproduct of the reaction. This waste water must be transported away from the reaction to be exhausted from the system by a fluid management sub-system.

Efforts are currently under way to create very small fuel cells, called microcells. It is anticipated that such microcells may eventually be adapted for use in many portable electronics applications. For example, such devices could be used for powering laptop computers and cell phones. Still, microcells present a number of design challenges that will need to be overcome before these devices can be practically implemented. For example, miniaturized electro-mechanical systems must be developed for controlling the fuel cell reaction, delivering fuel to the reactive components and disposing of water produced in the reaction. In this regard, innovations in fuel cell designs are beginning to look to silicon processing and other techniques from the fields of microelectronics and micro-systems engineering.

As with most other types of fluidic systems, microfluidic systems usually incorporate control valve devices that are implemented as discrete components. Discrete components tend to be bulky, however, which oftentimes impedes miniaturization efforts. Moreover, such control valve devices typically include pluralities of moving parts that must interoperate. The reliability of such devices, however, is generally inversely proportional to the number of moving parts since the moving parts tend to wear. Hence, an embedded control valve that can overcome the aforementioned limitations is needed for use in microfluidic systems.

SUMMARY OF THE INVENTION

The present invention relates to a method for controlling fluid flow. A fluid can be communicated to a first fluid flow port disposed adjacent to a first surface of a rotatable disk of a homopolar motor. The fluid can flow through at least one orifice in the rotatable disk to a second fluid flow port. The rotation of the disk can be selectively controlled to vary a fluid flow rate. Further, the disk can be rotated to align a selected one of the orifices with at least one of the first and second fluid flow ports. In another arrangement, the shape of the orifice can have a radial width that increases in a circumferential direction.

The disk can be resiliently biased toward a first rotation position. Further the disk can be rotated by flowing an electric current through the disk in the presence of a magnetic field aligned with an axis of rotation of the disk.

The invention further includes a fluid flow valve with a homopolar motor having a rotatable disk with at least one orifice. The orifice can have a radial width that increases in a circumferential direction. A first fluid flow port can be disposed adjacent to a first surface of the disk and a second fluid flow port can be disposed adjacent to a second surface of the disk.

The disk can be rotationally operable between a first position and at least a second position such that fluid flows from the first fluid flow port through the orifice in the first position, and the flow of fluid is reduced in the second position. The disk can be continuously variable between the first position and the second position. The microfluidic control valve can include a closed loop control circuit and at least one sensor to control the amount of rotation of the disk. The sensor can be an optical sensor, a hall sensor, a fluid flow sensor or an electrical current sensor. A biasing member can be included which resiliently biases the rotatable disk.

The disk can be disposed within a cavity defined in a substrate. The substrate can be a ceramic substrate, a liquid crystal polymer substrate or a semiconductor substrate. A fluid channel fluidically coupled to the first fluid flow port also can be defined within the substrate.

BRIEF DESCRIPTION OF THE DRAWINGS

FIGS. 7A–7H illustrate a process for manufacturing the microfluidic control valve on a semiconductor substrate, which is useful for understanding the present invention.

DETAILED DESCRIPTION OF THE PREFERRED EMBODIMENTS

The present invention relates to a microfluidic control valve (control valve). The control valve can be used in microfluidic systems to control a fluid flow rate, as well as to turn on and turn off fluid flow. Importantly, the control valve can be embedded in a substrate containing a fluid flow channel through which the fluid flows. The control valve can include a microelectromechanical homopolar motor (homopolar motor) to impede fluid flow as required via rotation of a disk having at least one orifice through which the fluid can flow. Through the rotation of the disk, the alignment of the orifice with respect to a fluid flow port can be varied, and thus provide a variable fluidic impedance. Notably, the disk can be very small. For example, the disk can have a diameter that is smaller than 1 cm, or even smaller than 1 mm. Accordingly, the system profile of the microfluidic system is smaller in comparison to fluidic systems using discrete components. Additionally, there are a reduced number of fluidic seals in the microfluidic system, thereby making the microfluidic system comparatively more robust.

The control valve can be a stand alone device or can be advantageously integrated with a larger system on the substrate. Examples of such larger systems can include fuel cells, micro-motors, and other MEMS type devices. Other examples can include fluid dielectric based devices in the RF field such as antenna elements, matching sections, delay lines, beam steering elements, tunable transmission lines, stubs and filters, variable attenuators, and cavity structures. Still, the invention is not limited to any particular type of device.

Figure 1:
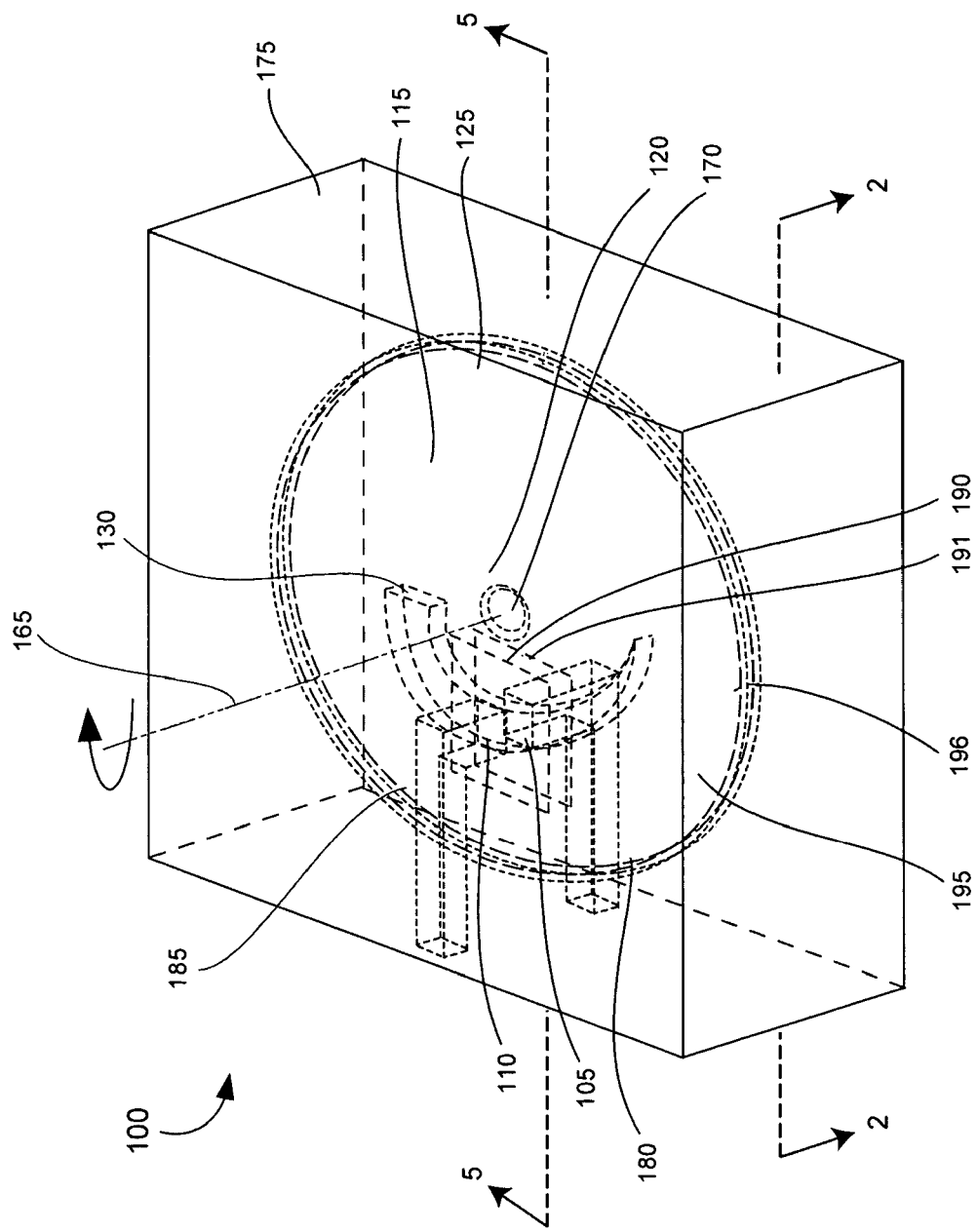
FIG. 1 is a perspective view of a microfluidic control valve that is useful for understanding the present invention.

A control valve 100 in accordance with the present invention is shown in FIG. 1. The control valve 100 can be manufactured on a variety of substrates. For example, the control valve 100 can be manufactured on a substrate made of liquid crystal polymer (LCP), ceramic, silicon, gallium arsenide, gallium nitride, germanium or indium phosphide. Still, the invention is not so limited and any substrate material suitable for a micro-electromechanical manufacturing process can be used.

The control valve 100 can include a first fluid flow port 105 and a second fluid flow port 110. The control valve 100 also includes a rotatable conductive disk (disk) 115, or rotor, having a central portion 120 and radial edge portion 125. At least one orifice 130 can be provided in the disk 115, located between the central portion 120 and the radial edge portion 125 of the disk. As defined herein, an orifice is an opening in the disk 115 through which fluid may flow. Although an orifice may have a continuous perimeter defined between the central portion 120 and the radial edge portion 125, as used herein the term is not so limited. For instance, an orifice within the meaning of this specification also may be only partially bounded by the material forming the disk 115. When fluid flow is desired, the orifice can be aligned, or partially aligned, with at least one of the fluid flow ports 110, 115.

Figure 2:
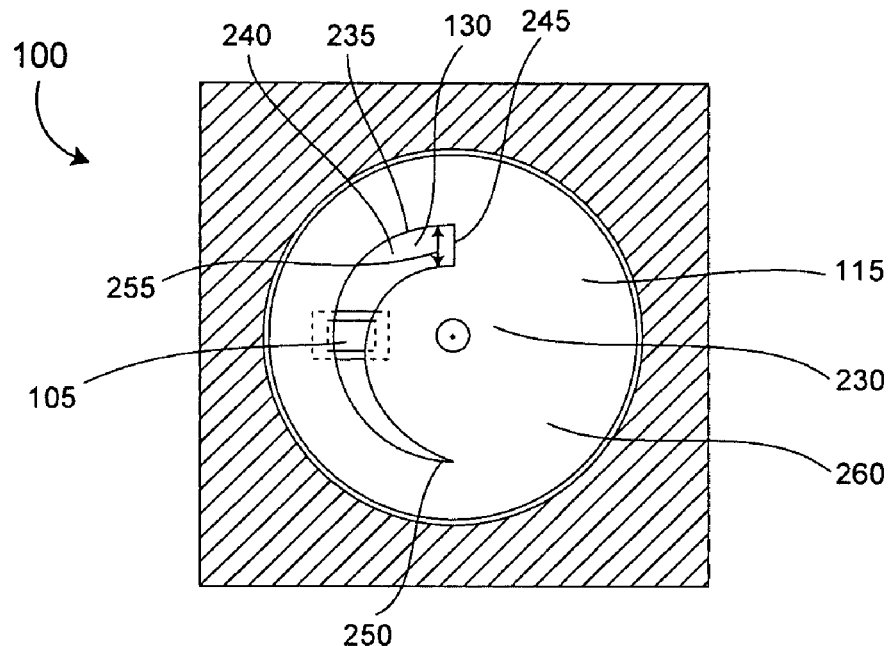
FIG. 2 is section view of a microfluidic control valve of FIG. 1, taken along section line 2—2.

Referring to FIG. 2, a section view of the control valve taken along section line 2—2 is shown. The orifice 130 of the disk 115 can be defined by a continuous perimeter 235 of an opening 240 within the disk 115. For example, the orifice 130 can be elongate having a first end 245 and a second end 250. The second end 250 can be narrower than the first end 245. Moreover, a width 255 of the orifice can decrease from the first end 245 to the second end 250. n this arrangement, fluid flow adjustment can be continuously varied by rotating the disk 115 to adjust alignment of the orifice 130 with one or both fluid flow ports. For instance, if a small amount of fluid flow is desired, the disk 115 can be oriented so that the second (narrower) end 250 of the orifice 130 is aligned with the fluid flow port 105. If a greater amount of fluid flow is desired, the disk 115 can be oriented so that the first (larger) end 245 of the orifice 130 can be aligned with one or both of the fluid flow ports 105, 110. Moreover, if it is desired that there be no fluid flow, a portion 260 of the disk 115 not having an orifice can be aligned with the fluid flow port 105.

Figure 3:
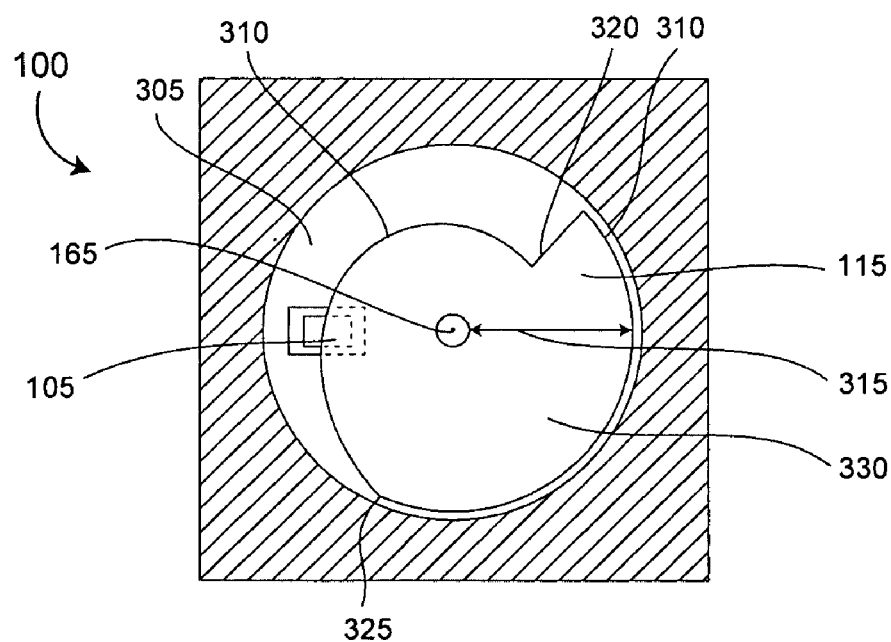
FIG. 3 is a section view of an alternate embodiment of the microfluidic control valve.

In another arrangement of the control valve 100, as shown in FIG. 3, an orifice 305 can be defined by a radial discontinuity in a perimeter 310 of the disk 115 (i.e. the perimeter 310 of the disk 115 does not have a constant radius 315 from the central axis 165 of the disk 115). For example, at a first end 320 of the orifice 305 the disk 115 can have a smaller radius 315 as compared to a second end 325 of the orifice 305.

In a first position, the disk 115 can be disposed such that the first end 320 of the orifice 305 is near the fluid flow port 105 such that the fluid flow port 105 is unimpeded by the disk 115. The disk can be rotated to a second position such that the second end 325 of the orifice 305 is near the fluid flow port 105 and flow of fluid through the fluid flow port 105 is impeded by the disk 115. As the disk 115 is rotated between the first and second positions, the perimeter 320 of the disk 115 can extend over the fluid flow port 105 and change the fluidic impedance at the port. In a position where a portion 330 of the disk 115 having a maximum radius 315 is proximate to the fluid flow port 105, the flow of fluid through the fluid flow port 105 can be stopped. For example, in the present example, the disk 115 can be rotated clockwise so that the fluid flow can be gradually reduced until fluid flow is stopped. The fluid flow can be stopped more abruptly by rotating the disk 115 counter clockwise so that the end 320 of the orifice passes over the fluid flow port 105 to place the portion 330 of the disk between the fluid flow ports 105.

Figure 4:
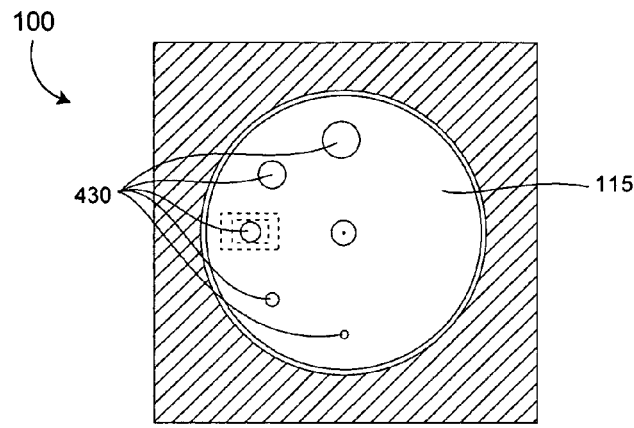
FIG. 4 is a section view of another embodiment of the microfluidic control valve.

In yet another embodiment of the control valve 100, multiple orifices 430 can be provided, as shown in FIG. 4. In this arrangement, fluid flow can be adjusted in discrete steps, as opposed to the fluid flow being continuously variable. For example, the disk 115 can be rotated until an orifice 430 having an appropriate size for the desired fluid flow is positioned over the fluid flow port 105.

At this point it should be noted that the embodiments disclosed in FIGS. 2–4 are presented for exemplary purposes only, and the present invention is not limited to the precise disk and orifice embodiments presented herein. For instance, while keeping in accordance with the present invention, disks and/or orifices can be provided to have any shapes or configurations that are suitable for controlling fluid flow through the control valve using one or more homopolar devices.

Referring again to FIG. 1, the disk 115 can be positioned proximate to a substrate surface, for example within a cavity 180 defined within a substrate 175. Importantly, the cavity 180 can have a shape that is substantially circular, square, rectangular, or any other desired shape. In one arrangement, the disk 115 can be provided with an axle 170 to facilitate rotation about the central axis 165 of the disk 115 and maintain the disk 115 in the proper operating position. Nevertheless, other arrangements can be provided as well. For example, in another arrangement the cavity 180 can be structured with a low friction peripheral surface 185 that maintains the disk 115 within the cavity 180. In yet another arrangement, a hole can be provided at the central axis 165 of the disk 115. The hole can fit over a cylindrical structure, such as a bearing, to maintain the operating position of the disk 115.

Gaskets 190, 191 can be provided to form a seal between the disk 115 and the first and second ports 105,110, thereby directing fluid through the orifice 130. For example, a gasket 190 can be provided between an upper surface 195 of the disk 115 and the second fluid flow port 110, and a gasket 191 can be provided between lower surface 196 of the disk and the first fluid flow port 105. In the case that the fluid which flows through the control valve 100 is a dielectric, seepage of fluid beyond the seal into cavity 180 typically will not present a problem so long as the dielectric is not corrosive to the disk 115 or the other components that may be contained in the cavity 180. However, in the case that the fluid is conductive, it can be beneficial to provide multiple gaskets both above and below the disk 115 to minimize the risk of fluid seepage into the cavity 180.

Figure 5:
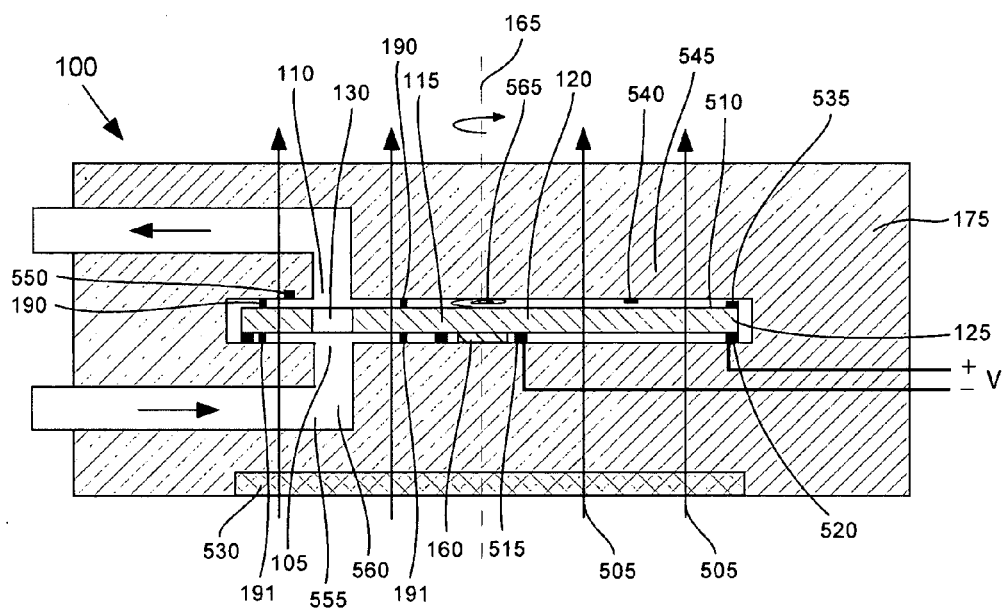
FIG. 5 is a cross section of the microfluidic control valve of FIG. 1 taken along section line 5—5.

Referring to FIG. 5, a cross section is shown of the control valve 100 of FIG. 1 taken along section line 5—5. The rotatable disk 115 is immersed in a magnetic field, illustrated with magnetic field lines 505, which are typically perpendicular to a surface 510 of the disk 115. One or more magnets 530 can be provided above and/or below the disk 115 to generate the magnetic field. The magnets 530 can include permanent magnets and/or electromagnets.

A first contact brush 515 can contact the disk 115 near its central portion 120, which is proximate to the disk central axis 165. A second contact brush 520, which can be radially spaced from the first contact brush 515 to contact the radial edge portion 125 of the disk 115. The second contact brush 520 can extend over a portion of the radial edge 125, or circumferentially extend under or around the entire radial edge 125.

In one arrangement, a contact brush (not shown) can be provided to contact the axle 160. Additional contact brushes also can be provided. For example, contact brushes can be spaced in a circular pattern to contact multiple points on the radial edge 125. Similarly, contact brushes can be spaced near the central portion 120 of the disk 115 to contact the central portion 120 at multiple points, to form a continuous circumferential contact surface at the central portion 120, or to contact the axle 160.

When voltage is applied across the contact brushes 515 and 520, causing current to flow through the disk 115, magnetic forces are exerted on the moving charges. The moving charges in turn exert the force to the disk 115, thereby causing the disk 115 to rotate. Notably, the direction of rotation depends on the direction of the current flow through the disk 115, for example, whether the current flows from the central portion 120 of the disk 115 to the radial edge portion 125, and vice versa. Accordingly, the polarity of the applied voltage can be changed when it is desired to change the direction of rotation of the conducive disk 115.

In one arrangement control stops can be provided to limit the amount of rotation of the disk 115. For example, a raised nub 535 can be disposed on the disk 115 at a radial distance from the central axis 165 of the disk 115. A plurality of raised nubs 540 can extend downward from an upper portion 545 of the substrate 175. The raised nubs 540 can be positioned at an approximately equivalent radial distance from the central axis 165 as the raised nub 535 at circumferentially offset locations. The raised nubs 535, 540 can be disposed on their respective surfaces such that the raised nub 535 abuts against a first one of the raised nubs 540 in a position of maximum clockwise rotation of the disk 115, and the raised nub 535 abuts a second one of the raised nubs 540 in a position of maximum counterclockwise rotation. Still, there are a number of other methods that can be used to limit the rotation of the disk 115 and the invention is not so limited.

In one arrangement the disk 115 can be resiliently biased into a particular position. For example, the disk 115 can be biased into a maximum clockwise rotation, a maximum counter clockwise rotation, or any other desired amount of rotation. To bias the disk 115, one or more biasing members 565 can connect between the disk 115 or axle 160 and any other non-rotational structure within the control valve 100. For example, the biasing members 565 can be springs, elastic members, or any other device that can be used to bias the disk 115. In this arrangement, an amount of electric current conducted through the disk and/or a strength of the magnetic field can be controlled to achieve a desired amount of disk 115 rotation.

In another arrangement, an electric current (bias current) can be conducted through the disk 115 to bias the disk 115. For example, a small amount of current can flow through the disk 115 to maintain the disk 115 in a maximum clockwise or counter clockwise rotation. The bias current can be removed when rotation of the disk 115 is desired.

As noted, gaskets 190, 191 can be provided to form a seal between the disk 115 and the first and second ports 105, 110, thereby directing fluid through the orifice 130. Further, a sensor 550 can be provided for monitoring the amount of disk rotation. For instance, the sensor 550 can be included in a closed loop control system which controls the rate of fluid flow. Such control systems are known to the skilled artisan. For example, the sensor can be an optical sensor which reads marks on the disk 115 that represent an amount of disk rotation. The marks can correlate to a width of a portion of the orifice 130 which is currently disposed between the fluid flow ports 105, 110. In another arrangement, an optical sensor also can be used to measure a width of the orifice 130 in the disk 115.

The sensor 550 also can be a Hall sensor that is used to measure the width of a portion of the orifice 130 which is currently disposed between the ports 105, 110. In particular, a portion of the disk 115 having a wider portion of the orifice 130 will have less material than a portion of the disk 115 having a narrower portion of the orifice 130. The Hall sensor can be used to measure changes in magnetic influence due to changes in the amount of material in respective portions of the disk 115.

In yet another arrangement, the sensor 550 can be a fluid flow sensor located proximate to a fluid channel 555 to measure the flow of fluid 560 within the channel 555. The sensor 550 also can be an electrical current sensor that monitors the electrical current through the disk 115, from which the amount of disk rotation can be determined. Still, there are a myriad of other sensors known to the skilled artisan that can be used to control the operation of the control valve, and thus the invention is not limited to the examples discussed herein.

Figure 6A:
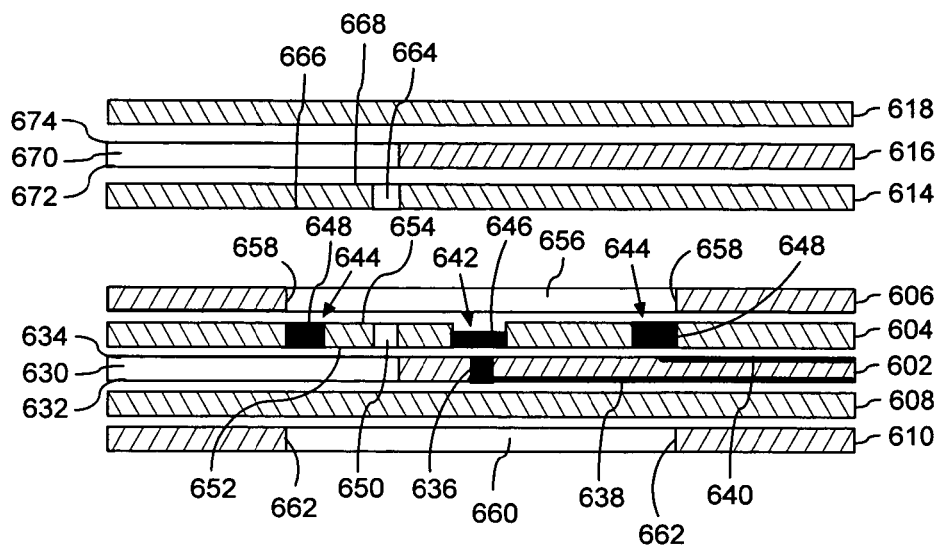
FIGS. 6A–6C illustrate a process for manufacturing the microfluidic control valve on a dielectric substrate, which is useful for understanding the present invention.
Figure 6B:
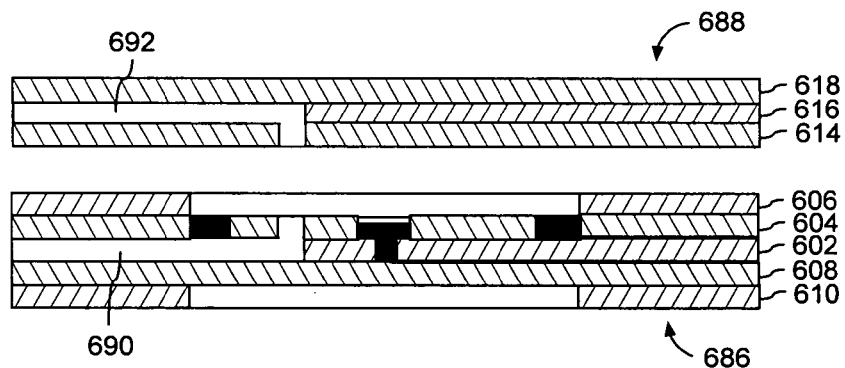
Figure 6C:
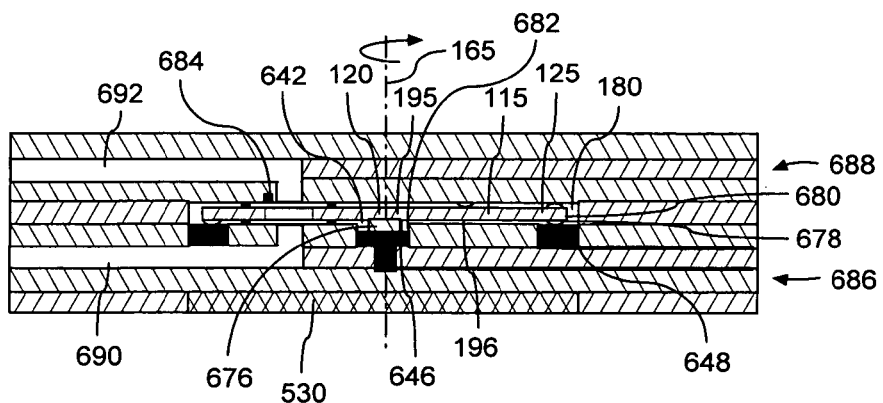

FIGS. 6A–6C represent one manufacturing process that can be used for manufacturing the control valve on a ceramic substrate. Nevertheless, it should be noted that the structures represented in FIGS. 6A–6C also can be implemented for manufacturing the control valve with other types of substrates, for example with LCP substrates. It should be noted, however, that the lamination and curing processes can differ for each type of substrate, as would be known to the skilled artisan.

One LCP substrate that can be used is R/flex® 3000 Series LCP Circuit Material available from Rogers Corporation of Rogers, Conn. The R/flex® 3000 LCP has a low loss tangent and low moisture absorption, and maintains stable electrical, mechanical and dimensional properties. The R/flex® 3000 LCP is available in a standard thickness of 50 µm, but can be provided in other thicknesses as well.

One ceramic substrate that can be used is low temperature 951 co-fire Green Tape™ from Dupont®. The 951 co-fire Green Tape™ is Au and Ag compatible, and has acceptable mechanical properties with regard to thermal coefficient of expansion (TCE) and relative strength. It is available in thicknesses ranging from 114 µm to 254 µm. Other similar types of systems include a material known as CT2000 from W. C. Heraeus GmbH, and A6S type LTCC from Ferro Electronic Materials of Vista, Calif. Any of these materials, as well as a variety of other LTCC materials with varying electrical properties can be used.

Referring to FIG. 6A, a first substrate layer 602 can be provided. The substrate material that is to be used in each of the substrate layers can be preconditioned before being used in a fabrication process. For example, if the substrate is ceramic, the ceramic material can be baked at an appropriate temperature for a specified period of time or left to stand in a nitrogen dry box for a specified period of time. Common preconditioning cycles are 160° C. for 20–30 minutes or 24 hours in a nitrogen dry box. Both preconditioning process are well known in the art of ceramic substrates.

Once the first substrate layer 602 is preconditioned, a fluid channel 630 can be formed in the first substrate layer 602 for carrying fluid through the control valve. In the arrangement shown, the fluid channel 630 extends from a bottom surface 632 of the first substrate layer 602 to a top surface 634 of the substrate layer 602, but the invention is not so limited. For instance, in the case that a substrate layer is used that is thicker than the desired diameter of the fluid channel 630, the fluid channel 630 can be contained between the bottom surface 632 and the top surface 634, and a via can be used to tap into the fluid channel 630 where desired.

A conductive via 636 can be formed in the first substrate layer 602 to provide electrical conductivity through the substrate layer. Many techniques are available for forming conductive vias in a substrate. For example, vias can be formed by mechanically punching holes or laser cutting holes into the substrate. The holes then can be filled with a conductive material, such as a conventional thick film screen printer or extrusion via filler. Vacuum can be applied to the first substrate layer 602 through a porous stone to aid via filling. Once the conductive via 636 has been formed in the first substrate layer 602, the conductive material can be dried in a box oven at an appropriate temperature and for an appropriate amount of time. For example, a common drying process is to bake the ceramic substrate having the conductive material at 160° C. for 5 minutes.

After the conductive filler in the via has dried, a first conductive circuit trace 638 and a second conductive circuit trace 640 can be provided. The circuit traces 638, 640 can be deposited onto the first substrate layer 602 using a conventional thick film screen printer, for example, standard emulsion thick film screens. In one arrangement, the circuit traces 638, 640 can be deposited onto opposite sides of the first substrate layer 602, with the first circuit trace 638 being in electrical contact with the conductive via 636. The second circuit trace 640 can extend around, and be concentric with, the conductive via 636. Nonetheless, a myriad of other circuit layouts can be provided, as would be known to the skilled artisan. As with the via filling process, once the circuit traces have been applied to the first substrate layer 602, the circuit traces can be dried in a box oven at an appropriate temperature and for an appropriate amount of time.

Subsequent substrate layers can be laminated to the first substrate layer 602 after appropriate preconditioning and drying of the circuit traces and/or via fillers. In particular, a second substrate layer 604 can be stacked onto the first substrate layer 602. The second layer 604 can insulate circuit traces on the top of the first substrate layer 602. The second substrate layer also can include vias 642, 644, which can be filled with material to form an axial contact brush 646 and at least one radial contact brush 648, respectively. The vias can be positioned so that the contact brushes are electrically continuous with respective circuit traces 638, 640. In one arrangement, a plurality of radial contact brushes 648 or a continuous radial edge contact brush can be disposed concentric with, and at a uniform radius from, the axial contact brush 646 to reduce a net contact resistance between the a conductive object and the brushes.

The contact brushes can include any conductive material suitable for use in a contact brush, for example a conductive epoxy, conductive polymer, carbon nano composite or a conductive liquid. In the case that the contact brushes are a solid material, such as carbon nano composite, the contact brushes can be screen printed into the vias in the second substrate layer 604 using a conventional thick film screen printer. In the case that a conductive liquid is used as contact brushes, ferromagnetic properties can be incorporated into the conductive liquid so that a magnetic field can contain the conductive liquid within the vias 642, 644. In one arrangement, the axial contact brush 646 can fill only part of the via 642 so that a top surface of the via is disposed below an upper surface 654 of the second substrate layer 604. Accordingly, the via 642 also can function as a bearing. The second substrate layer 604 also can include a fluid channel 650 extending from a lower surface 652 to the upper surface 654 of the second substrate layer 604. The fluid channel 650 can align with a portion of the fluid channel 630 so that fluid can flow between the fluid channels 630, 650.

A third substrate layer 606 can be stacked above the second substrate layer 604. The third substrate layer 606 can incorporate an aperture 656 having a radius edge 658 aligned with an outer radius of vias 644 (a portion of each via furthest from the via 642). A fourth substrate layer 608 can be stacked below the first substrate layer 602 to insulate circuit traces on the lower surface 632 of the first substrate layer 602. Further, a fifth substrate layer 610 can be stacked below the fourth substrate layer 608. The fifth substrate layer 610 also can include an aperture 660 having an outer radius 662.

A sixth substrate layer 614 can include a fluid channel 664 extending from a lower surface 666 of the sixth substrate layer 614 to an upper surface 668 of the sixth substrate layer 614. Further, a seventh substrate layer 616 can include a fluid channel 670 extending from a lower surface 672 to the upper surface 674 of the seventh substrate layer 616. The fluid channel 670 can align with a portion of the fluid channel 664 so that fluid can flow between the fluid channels 664, 670. Finally, an eighth substrate layer 618 can be provided.

In some instances it can also be desirable to include a conductive ground plane (not shown) on at least one side of one or more of the substrate layers 602, 604, 606, 608, 610, 614, 616, 618. For example, the ground plane can be used in those instances where RF circuitry is formed on the surface of a substrate layer. The conductive ground plane also can be used for shielding components from exposure to RF and for a wide variety of other purposes. The conductive metal ground plane can be formed of a conductive metal that is compatible with the substrate. Still, those skilled in the art will appreciate that the ground plane is not required for the purposes of the invention.

Referring to FIG. 6B, the first five layers 602, 604, 606, 608, 610 can be stacked to form a bottom substrate structure 686 and define a fluid channel 690. The substrate layers 614, 616, 618 can be stacked to form a top substrate structure 688 and define a fluid channel 692. Importantly, it should be noted that the layer scheme presented herein is by example only. A greater number or a fewer number of substrate layers also can be used.

Once the substrate layers have been stacked to form the substrate structures 686, 688, each of the structures 686, 688 can be laminated using a variety of lamination methods. In one method, the substrate layers can be stacked and hydraulically pressed with heated platens. For example, a uniaxial lamination method presses the substrate layers together at 3000 psi for 10 minutes using plates heated to 70° C. The substrate layers can be rotated 165° following the first 5 minutes. In an isotatic lamination process, the substrate layers are vacuum sealed in a plastic bag and then pressed using heated water. The time, temperature and pressure can be the same as those used in the uniaxial lamination process; however, rotation after 5 minutes is not required. Once laminated, the structures 686, 688 can be fired inside a kiln on a flat tile. For example, the substrate layers can be baked between 200° C. and 500° C. for one hour and a peak temperature between 850° and 875° can be applied for greater than 15 minutes. After the firing process, post fire operations can be performed on the substrate layers.

Referring to FIG. 6C, the disk 115 can be provided within the cavity 180. The disk 115 can be comprise a conductive material, such as aluminum, copper, brass, silver, gold, steel, stainless steel, or any other rigid conductive material. In another arrangement, the disk 115 can comprise a plurality of materials, for example a semi-rigid conductive material that is laminated to a rigid material, for instance ceramic. The disk 115 can include a central contact 676 axially located on the lower surface 196, and at least one radial contact 678, also located on the lower surface 196. In one arrangement, the radial contact 678 can extend around the lower peripheral region 680 of the disk 115. The disk 115 can be positioned above the second substrate layer 604 so that the central contact 676 makes electrical contact with the axial contact brush 646 and the radial contact 678 makes electrical contact with the radial edge contact brush 648. Accordingly, electrical current can flow between central portion 120 and radial edge portion 125 when voltage is applied across the contact brushes 646, 648. The radial wall 682 of the via 642 can function as a bearing surface for the central contact 676 of the disk 115. Alternatively, bearings (not shown) can be installed between the radial wall 682 and the central contact 676. The bearings can be, for example, electromagnetic or electrostatic bearings.

As noted, a sensor 684 can be provided for use in a control circuit for controlling operation of the disk 115. The sensor 684 can be attached to the structures 686, 688 or within either of the fluid channels 690, 692, depending on the type of sensor that is used. Circuit traces can be provided as required for propagating sensor data, as would be known to the skilled artisan.

One or more magnets can be fixed above and/or below the disk 115 to provide the magnetic field aligned with an axis of rotation of the disk 115. For example, a magnet 530 can be attached to the bottom of the substrate structure 686, for example in the aperture 660, such that the magnet 530 is spaced from the lower surface 196 of the disk 115. Nonetheless, the invention is not limited in this regard. For instance, a magnet 530 also can be spaced from the upper surface 195 of the disk 115. The magnet 530 can be a permanent magnet, such as a magnet formed of magnetic material. For example, the magnet 530 can be made of ferrite, neodymium, alnico, ceramic, and/or any other material that can be used to generate a magnetic field.

The magnet 530 also can be a non-permanent magnet, for example, an electromagnet. In another arrangement, the magnet can be a combination of one or more permanent magnets and one or more non-permanent magnets, for example, an electromagnet adjacent to one or more layers of magnetic material. As previously noted, the strength of the magnetic field generated by an electromagnet can be varied by varying the current through the conductor of the electromagnet, which can provide an additional means for controlling the amount of rotation of the disk 115.

In another exemplary embodiment, the control valve 100 can be manufactured on a semiconductor substrate, for example on a silicon substrate using a polysilicon microfabrication process. Polysilicon microfabrication is well known in the art of micromachining. One such process is disclosed in David A. Koester et al., *MUMPs Design Handbook* (Rev. 7.0, 2001). An exemplary polysilicon microfabrication process is shown in FIGS. 7A–7H. It should be noted, however, that the invention is not limited to the process disclosed herein and that other semiconductor microfabrication processes can be used.

Referring to FIG. 7A, a first silicon substrate layer (first silicon layer) 702 can be provided to begin forming the control valve structure 700, for example, a silicon wafer typically used in IC manufacturing. In some cases, it may be desirable for the first silicon layer 702 to have electrically insulating properties. Accordingly, the first silicon layer 702 can be formed without doping or have only a light doping.

A first structural layer of polysilicon (poly 1 layer) 704 can be deposited onto the first silicon layer 702 using low pressure chemical vapor deposition (LPCVD). The poly 1 layer 704 then can be etched to form a first channel portion 706. In an alternate arrangement, the first channel portion 706 region can be masked prior to application of the poly 1 layer 704, thereby preventing deposition in the first channel portion 706 region.

After the first channel portion 706 has been formed, it can be filled with a sacrificial material 707, for example silicon dioxide ($SiO_2$) or phosphosilicate glass (PSG). The sacrificial material can be removed at the end of the process, as is further discussed below. The sacrificial material can be deposited by LPCVD and annealed to the circuit. For example, in the case that PSG is used for the sacrificial material, the sacrificial material can be annealed at 1150° C. in argon. The sacrificial material then can be planarized within the channel 706 using a planarizing etch-back process to form a flat base 708 upon which a second polysilicon layer (poly 2 layer) 710 can be deposited.

The second structural layer of polysilicon (poly 2 layer) 710 can be deposited onto the poly 1 layer 704 using LPCVD. The poly 2 layer 710 then can be etched to form a second channel portion 712. Alternatively, the second channel region 712 can be masked prior to application of the poly 2 layer 710, thereby preventing deposition in the second channel portion 712. The second channel portion 712 can be filled with a sacrificial material 713. Again, the sacrificial material can be removed at the end of the process.

A conductive layer, for example a layer of doped polysilicon or aluminum, can be deposited onto the poly 2 layer 710. After deposition of the conductive layer, conductive circuit traces 714 can be defined using known lithography and etching techniques. After the circuit traces are formed, an electrically insulating layer 716, such as silicon nitride (SiN), can be deposited over the poly 2 layer 710 and the circuit traces 714. For example, LPCVD involving a reaction of dichlorosilane ($SiH_2Cl_2$) and ammonia ($NH_3$) can be used to deposit an insulating layer. A typical thickness for the SiN layer is approximately 600 nm, but other thicknesses can be used.

A third channel portion 718, inner vias 720 and outer vias 722 then can be formed through the insulating layer 716. A gasket 724 can be formed around the third channel portion 718, on the surface of the electrically insulating layer 716.

The gasket 724 can be formed using a photodefinable polymer, such as a benzocyclobutene-based polymer, polyimide or SU-8. Such polymers are commercially available. For instance, SU-8 is commercially available from Micro-Chem Inc. of Newton, Mass. 02164. The polymer can be deposited using thin film deposition and shaped using photo lithography. Such processes are known to the skilled artisan.

The inner vias 720 and outer vias 722 can be filled with electrically conductive material (e.g. aluminum) to electrically contact the circuit traces 714 at desired locations. Axial contact brushes 726 then can be deposited on inner vias 720 and radial edge contact brushes 728 can be deposited on outer vias 722 so that the contact brushes 726 and 728 are electrically continuous with the respective vias 720 and 722 and correlating circuit traces 714. Two axial contact brushes 726 and two radial edge contact brushes 728 are shown in the figure, but additional axial and radial edge contact brushes can be provided. Further, the contact brushes can include any conductive material suitable for use in a contact brush, for example, a carbon nano composite which can be applied using a thermo spray method commonly known to the skilled artisan. In another arrangement, the contact brushes can be a conductive liquid.

A third structural layer of polysilicon (poly 3 layer) 730 can be deposited onto the insulating layer 716 using LPCVD. The poly 3 layer 730 then can be etched to form a radial aperture 732, which exposes the gasket 724 and the contact brushes 726 and 728. In an alternate arrangement, the aperture 732 region can be masked prior to application of the poly 3 layer 730, thereby preventing deposition in the aperture 732 region.

Referring to FIG. 7B, a first sacrificial layer 734, for example silicon dioxide (SiO$_2$) or phosphosilicate glass (PSG), can be applied to the substrate over the previously applied layers. The first sacrificial layer 734 can be removed at the end of the process. The sacrificial layer can be deposited by LPCVD and annealed to the circuit. Referring to FIG. 7C, the first sacrificial layer 734 then can be planarized within the aperture 732 using a planarizing etch-back process to form a flat base 736 within the aperture 732 that is recessed from an upper elevation 738 of the first sacrificial layer 734.

Referring to FIG. 7D, a conductor then can be deposited into the aperture 732 to form a disk (disk) 740 having opposing upper surface 742, a lower surface 744, an axial portion 746, and a radial edge portion 748. Further, the disk 740 can be wholly contained within the aperture 732 so that the only material contacting the disk 740 is the first sacrificial layer 734. The thickness of the disk 740 can be determined by the thickness of the first sacrificial layer 734 and the amount of etch-back. Importantly, mechanical characteristics, such as rigidity, should be considered when selecting a thickness for the disk 740.

Figure 7E:
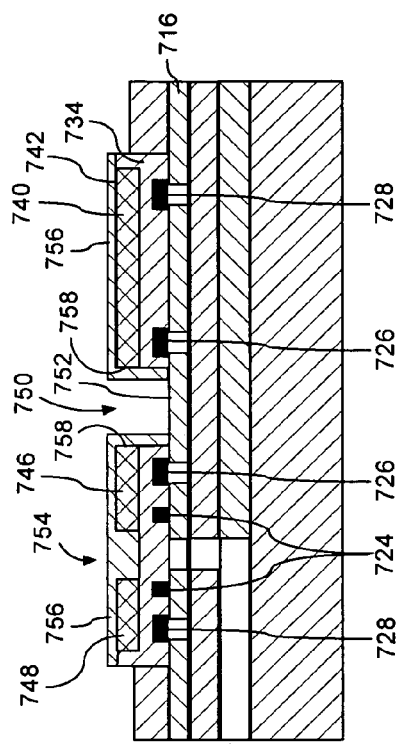

Referring to FIG. 7E, a first orifice 750 then can be etched through the inner region of the disk 740 and through the first sacrificial layer 734 below the center of the disk 740 to expose the insulating layer 716. Notably, the first orifice 750 can be sized to form a hole in the disk 740 having a radius equal to or smaller than the radial distance between opposing axial contact brushes 726 and 728. Further, a portion of the first sacrificial layer 734 in contact with the insulating layer 716 also can be etched away to expose a region 752 of the insulating layer 716 below the first orifice 750. Additionally, a second orifice 754 can be etched through the disk 740 in a region of the disk 740 disposed between the axial portion 746 and the radial edge portion 748. The second orifice can be narrower than a width of the gasket 724. Known etching techniques can be used, for example reactive ion etch (RIE), plasma etching, etc.

A second sacrificial layer 756, for example SiO$_2$ or PSG, then can be applied over an upper surface 742 of the disk 740 and over the radial wall 758 formed by the first orifice 750. The region 752 of the insulating layer 716 should be masked during the application of the second sacrificial layer 756 to prevent the second sacrificial layer 756 from adhering to the insulating layer 716 in the region 752. Alternatively, a subsequent etching process can be performed to clear away the second sacrificial layer from the region 752.

Figure 7F:
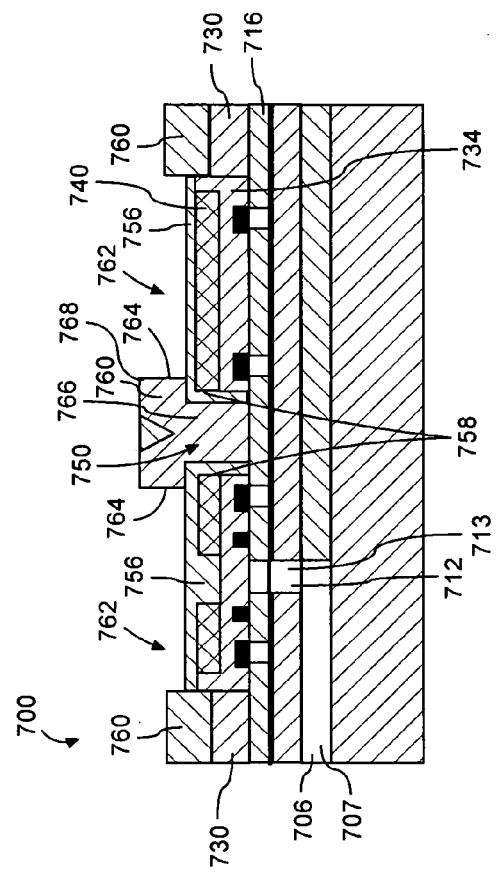

Referring to FIG. 7F, using LPCVD, a fourth layer of polysilcon (poly 4 layer) 760 can be deposited over the previously applied layers, for example over the poly 3 layer 730 surrounding the disk 740, thereby adding an additional silicon structure. Notably, the poly 4 layer 760 also can fill the orifice 750. A portion of the poly 4 layer 760 then can be etched to remove a washer shaped portion 762 of the poly 4 layer 760 located above the disk 740. Notably, the inner radius of the washer shaped region 764 can be larger than the inner radius of the disk 740. Accordingly, the etching of the poly 4 layer 760 can leave a structure 766, having a "T" shaped cross section, within the first orifice 750. An upper portion 768 of the structure 766 can extend over the inner portion 758 of disk 740, thereby limiting vertical movement of the disk 740 once the sacrificial layers are removed. Further, the structure 766 can operate as a bearing around which the disk 740 can rotate. Alternatively, electromagnetic or electrostatic bearings can be provided in the first orifice 750.

The sacrificial material 707, 713 in the first and second channel regions 706, 712, respectively, and the first and second sacrificial layers 734, 756 then can be released from the control valve structure 700, for example using a hydrogen fluoride (HF) solution. Such a process is known to the skilled artisan. For example, the control valve structure 700 can be dipped in an HF bath. HF does not attack silicon or polysilicon, but quickly etches SiO$_2$. Notably, the HF can etch deposited SiO$_2$ approximately 100× faster than SiN.

Figure 7G:
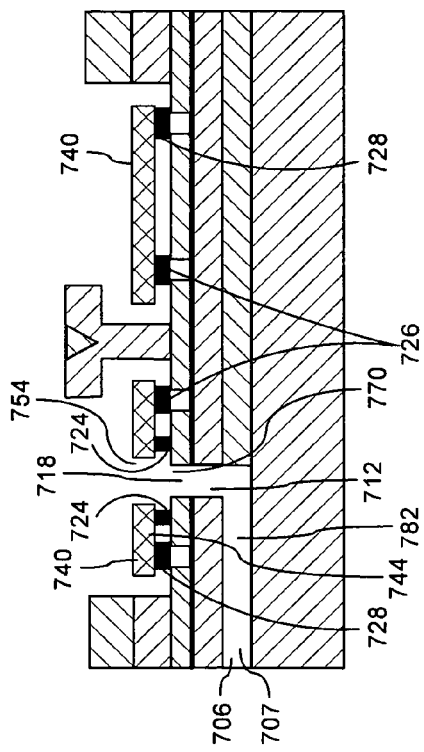

Referring to FIG. 7G, the release of the sacrificial material and sacrificial layers clears the first, second and third channel portions 706, 712, 718 to form a fluid channel 782. Further, the release of the sacrificial layers enables the lower portion 744 of the disk 740 to seat on the gasket 724, thereby forming a fluidic seal. Accordingly, fluid can flow through the fluid channel and through a first fluid flow port 770 disposed between sides of the gasket 724 to flow through the second orifice 754 within the disk 740. The release of the sacrificial layers also enables the disk 740 to rest upon, and make electrical contact with, the axial and radial edge contact brushes 726 and 728. The disk 740 then can be free to rotate about its axis and can be used to regulate fluid flow through the first fluid flow port 770.

Figure 7H:
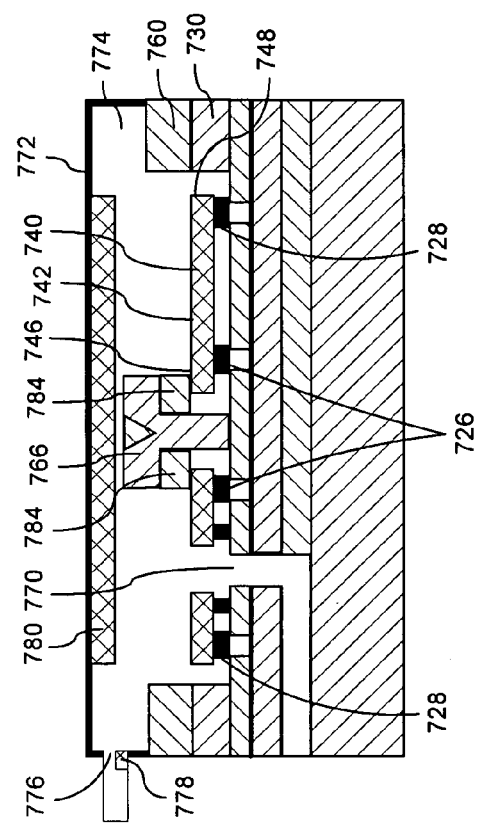

A lid 772 can be provided above the disk 740 to provide an enclosed region 774 in which the disk 740 can rotate, as shown in FIG. 7H. A second fluid flow port 776 can be provided in the lid 772 and fluidically coupled to the first fluid flow port 770. However, the invention is not limited in this regard. For example, the second fluid flow port can be positioned to allow fluid flow through a second fluid channel within one or more of the substrate layers. Further, a sensor 778 also can be provided. For example, in the case that the sensor 778 is a fluid flow sensor, the sensor 778 can be located proximate to the second fluid flow port 776, as shown, or proximate to the first fluid flow port 770. Still, as previously noted, other types of sensors can be implemented. Circuit traces can be provided for as required for propagating sensor data, as would be known to the skilled artisan.

A magnet 780 can be fixed above and/or below the disk 740 to provide a magnetic field aligned with the axis of rotation of the disk 740. For example, the magnet 780 can be attached to the bottom of the lid 772, spaced from the upper surface 742 of the disk 740. Further, a magnet 780 can be attached to the bottom of the first silicon substrate below the disk 740, for example using additional substrate layer.

As previously noted, the magnet 780 can be a permanent magnet, non-permanent magnets, or a combination of a permanent magnet and a non-permanent magnet. For example, the magnet can include an electromagnet and one or more layers of magnetic material. The strength of the magnetic field generated by an electromagnet can be varied by varying the current through the conductor of the electromagnet, which can be useful for varying the output current of the control valve, also as previously noted. In operation, a voltage applied across axial contact brush 726 and radial edge contact brush 728 causes current to flow between the axial portion 746 and the radial edge portion 748 of the disk 740, thereby causing the disk to rotate, as previously described. A gasket 784 can be disposed between the T-shaped structure 766 and the disk 710 to maintain the position of the disk 740 in contact with contact brushes 726, 728. For example, the gasket 784 can comprise a photodefinable polymer, such as a benzocyclobutene-based polymer, polyimide or SU-8. Such polymers are commercially available. For instance, SU-8 is commercially available from MicroChem Inc. of Newton, Mass. 02164. Teflon and Vespel, available from Dupont®, also are materials that can be used for the gasket 784. In one arrangement, the gasket 784 can be attached to the lid 772 or magnet 780 and lightly pressed down over the structure 766 when assembled.

In another arrangement, a framework with standoffs can be attached to the lid 772, the insulating layer 730, the poly 3 layer 730, and/or the poly 4 layer 760. The standoffs can maintain the position of the disk 740 in contact with contact brushes 726, 728. The standoffs can comprise a photodefinable polymer, Teflon, or Vespel. Additionally, the framework can be perforated to allow fluid flow. Alternatively, aerodynamic forces caused by rotation of the disk 740 can maintain the position of the disk 740 in contact with contact brushes 726, 728.

Figure 8:
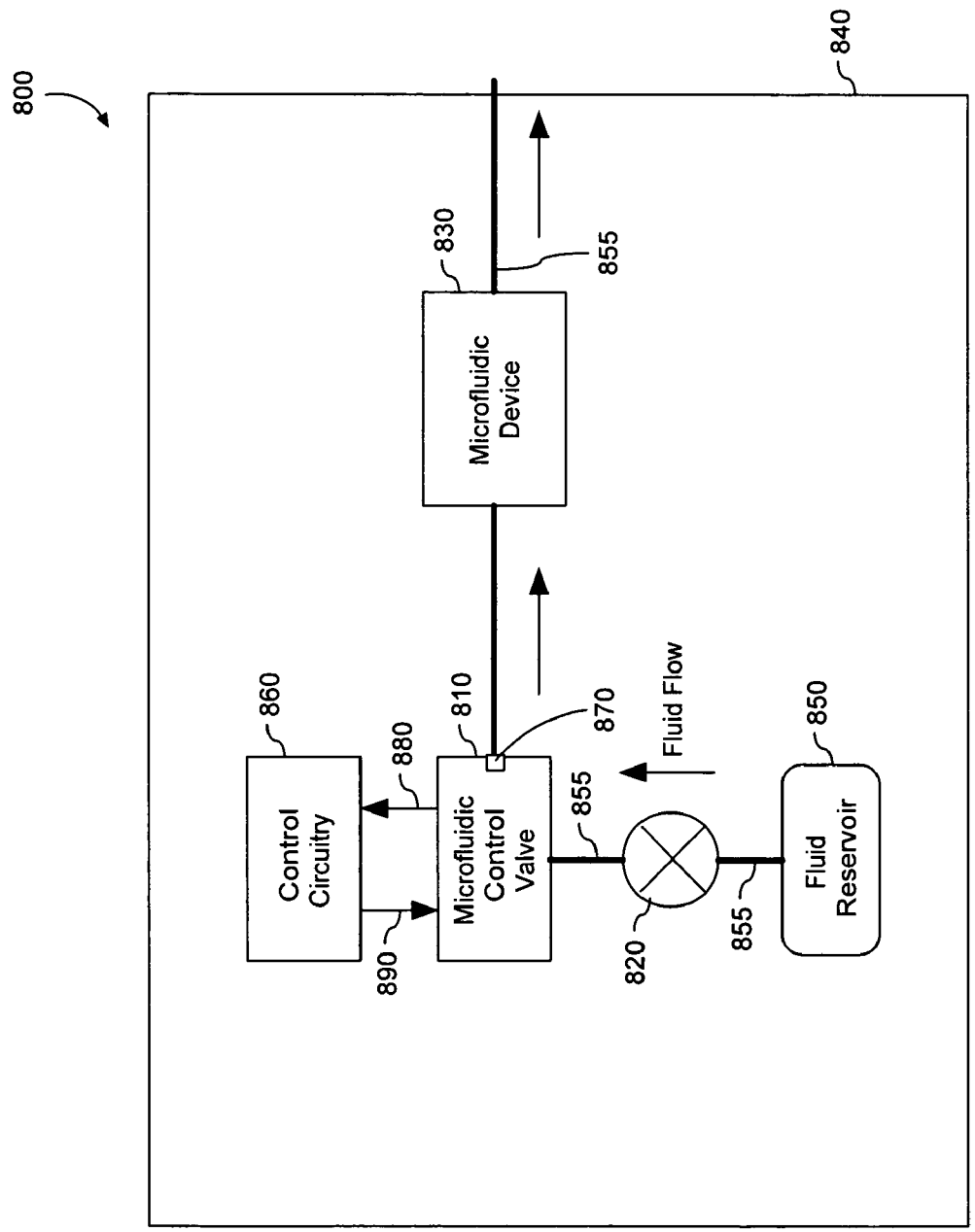
FIG. 8 is a schematic diagram of a fluidic system that is useful for understanding the present invention.

A fluidic system 800 that is useful for understanding the present invention is shown in FIG. 8. Examples of such systems can include fuel cells, micro-motors, and other MEMS type devices. Other examples can include fluid dielectric based devices in the RF field such as antenna elements, matching sections, delay lines, beam steering elements, tunable transmission lines, stubs and filters, variable attenuators, and cavity structures. Still, the invention is not limited to any particular type of system.

The fluidic system 800 can include a control valve 810 embedded in a substrate 840, a fluid pump 820, and a microfluidic device 830. Further, a fluid reservoir 850 can be provided. The fluid reservoir 850 can be embedded in the substrate 840 as shown, or be provided as a discrete unit. The control valve 810, the fluid pump 820, the microfluidic device 830 and the fluid reservoir 850 can be fluidically coupled via fluid channels 855, for example fluid channels within the substrate 840.

The fluidic system 800 also can include control circuitry 860, for example to provide a closed loop control circuit that controls operation of the control valve 810. The control circuitry 860 can receive fluid data 880 from a sensor 870 that measures fluid flow through the control valve 810. As noted, the sensor 870 can be contained within the control valve 810, but the invention is not so limited. For instance, the sensor can be external to the control valve 810. The control circuit 860 can process the fluid flow data 880 and generate one or more control signals 890 that are propagated to the control valve 410. For example, the control signal 890 can be a voltage potential that causes electric current to flow through the disk of homopolar motor, thereby causing the disk to rotate, as previously discussed.

Figure 9:
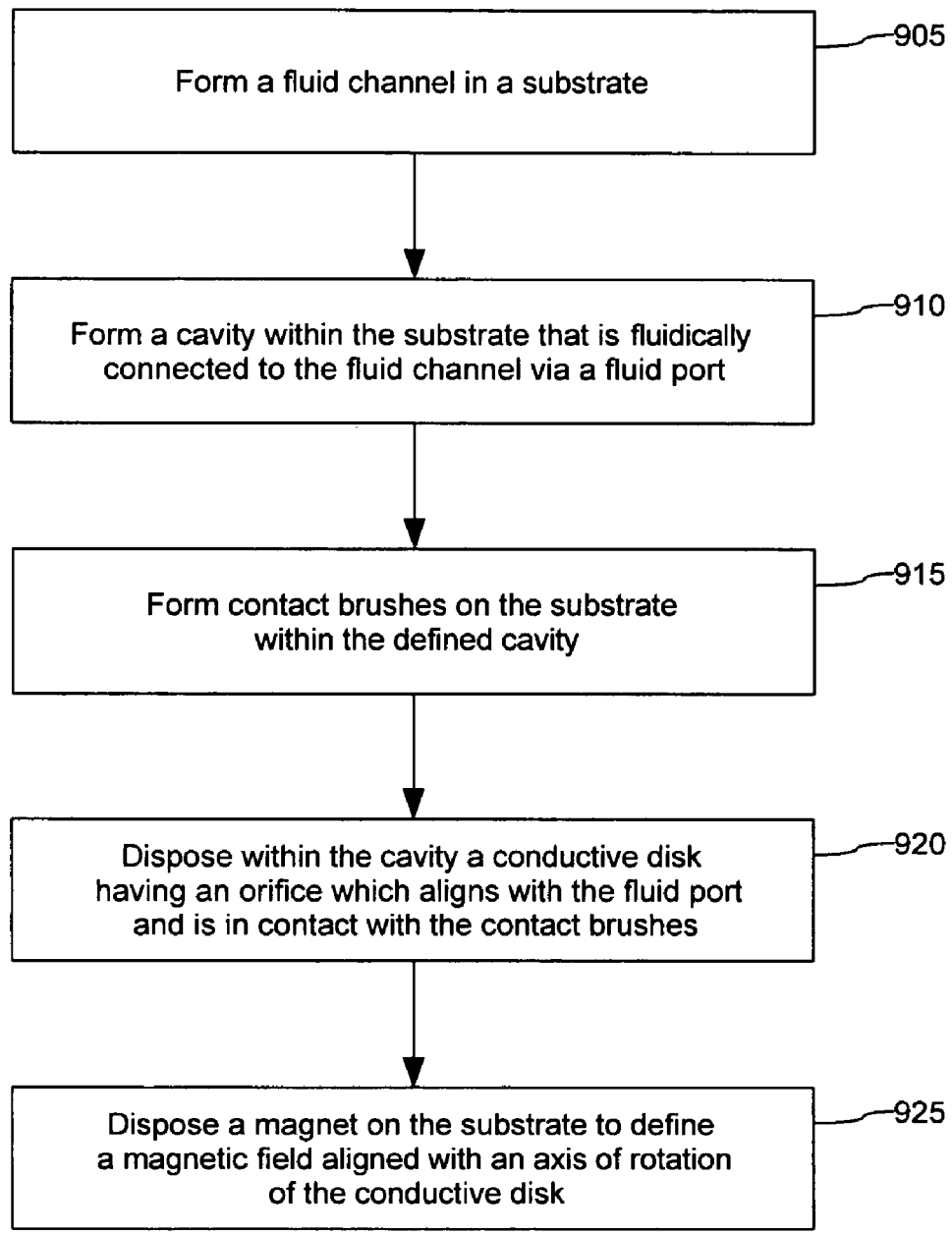
FIG. 9 is a flow chart that is useful for understanding the present invention.

A flow-chart 900 which is useful for understanding the method of the present invention is shown in FIG. 9. Beginning at step 905, a fluid channel can be formed in a substrate. A cavity also can be formed within the substrate, as shown in step 910. The cavity can be fluidically connected to the fluid channel via a fluid flow port. Continuing at step 915, contact brushes can be formed on the substrate within the cavity. At least one contact brush can be disposed proximate to a central portion of the cavity and at least one contact brush can be disposed proximate to a radial edge portion of the cavity. Proceeding to step 920, a conductive disk having an axial portion and a radial edge portion then can be disposed within the cavity. An orifice can be defined in the cavity between the axial portion and the radial edge portion such that the orifice aligns with the fluid flow port in at least one of a first and a second position of the conductive disk. The conductive disk can be disposed to make electrical contact with the contact brushes. Referring to step 925, a magnet can be disposed on the substrate to define a magnetic field aligned with an axis of rotation of the conductive disk.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method for controlling fluid flow comprising:
   communicating a fluid to a first fluid flow port disposed adjacent to a first surface of a rotatable disk forming a portion of a homopolar motor;
   flowing the fluid through at least one orifice in the rotatable disk to a second fluid flow port; and
   causing a rotation of said rotatable disk by flowing an electric current along at least a portion of a radial path defined between a center of said rotatable disk and a peripheral edge of said rotatable disk.

2. The method according to claim 1 further comprising selectively controlling a rotation of the rotatable disk to vary a fluid flow rate.

3. The method according to claim 2 wherein the selectively controlling step further comprises rotating the rotatable disk to align a selected one of a plurality of orifices with at least one of the first and second fluid flow ports.

4. The method according to claim 1 further comprising selecting a shape of the at least one orifice to have a radial width that increases in a circumferential direction.

5. A method for controlling fluid flow comprising:
   communicating a fluid to a first fluid flow port disposed adjacent to a first surface of a rotatable disk forming a portion of a homopolar motor;
   flowing the fluid through at least one orifice in the rotatable disk to a second fluid flow port; and
   rotating the rotatable disk by flowing an electric current through the disk in the presence of a magnetic field aligned with an axis of rotation of the rotatable disk.

6. A fluid flow valve comprising:
- a homopolar motor comprised of a rotatable disk disposed within a magnetic field aligned with an axis of rotation of said rotatable disk;
- at least one electrical contact forming an electrical connection with a portion of said rotatable disk;
- a first fluid flow port disposed adjacent to a first surface of the rotatable disk;
- a second fluid flow port disposed adjacent to a second surface of the rotatable disk; and
- at least one orifice in the rotatable disk connecting the first and second fluid flow ports.

7. The fluid flow valve of claim 6 wherein said rotatable disk is rotationally operable between a first position and at least a second position such that fluid flows from said first fluid flow port through said orifice in said first position, and said flow of fluid is reduced in said second position.

8. The fluid flow valve of claim 7 wherein a position of said rotatable disk is continuously variable between said first position and said second position.

9. The fluid flow valve of claim 6 wherein said at least one orifice has radial width that increases in a circumferential direction.

10. The fluid flow valve of claim 6 further comprising a biasing member which resiliently biases said rotatable disk.

11. The fluid flow valve of claim 6 wherein said rotatable disk is disposed within a cavity defined in a substrate.

12. The fluid flow valve of claim 6 further comprising a closed loop control circuit to control an amount of rotation of said rotatable disk.

13. The fluid flow valve of claim 12 wherein said closed loop control circuit further comprising at least one sensor selected from the group consisting of an optical sensor, a hall sensor, a fluid flow sensor and an electrical current sensor.

14. A fluid flow valve comprising:
- a homopolar motor comprised of a rotatable disk, said rotatable disk disposed within a cavity defined in a substrate selected from the group consisting of a ceramic substrate, a liquid crystal polymer substrate, and a semiconductor substrate;
- a first fluid flow port disposed adjacent to a first surface of the rotatable disk;
- a second fluid flow port disposed adjacent to a second surface of the rotatable disk; and
- at least one orifice in the rotatable disk connecting the first and second fluid flow ports.

15. A fluid flow valve comprising:
- a homopolar motor comprised of a rotatable disk, said rotatable disk disposed within a cavity defined in a substrate selected from the group consisting of a ceramic substrate, a liquid crystal polymer substrate, and a semiconductor substrate;
- a first fluid flow port disposed adjacent to a first surface of the rotatable disk;
- a second fluid flow port disposed adjacent to a second surface of the rotatable disk; and
- at least one orifice in the rotatable disk connecting the first and second fluid flow ports;
- wherein a fluid channel fluidically coupled to said first fluid flow port is defined within said substrate.

* * * * *